(12) United States Patent
Mochida

(10) Patent No.: US 8,120,844 B2
(45) Date of Patent: Feb. 21, 2012

(54) IMAGE MEASURING APPARATUS

(75) Inventor: Daisaku Mochida, Nagoya (JP)

(73) Assignee: Nikon Corporation, Toyko (JP)

( * ) Notice: Subject to any disclaimer, the term of this patent is extended or adjusted under 35 U.S.C. 154(b) by 0 days.

(21) Appl. No.: 12/465,806

(22) Filed: May 14, 2009

(65) Prior Publication Data

US 2009/0225412 A1    Sep. 10, 2009

Related U.S. Application Data

(63) Continuation of application No. PCT/JP2007/071369, filed on Nov. 2, 2007.

(30) Foreign Application Priority Data

Nov. 22, 2006   (JP) ................................ 2006-315382

(51) Int. Cl.
  *G02B 21/06*   (2006.01)
  *G02B 21/00*   (2006.01)
(52) U.S. Cl. ........................................ 359/385; 359/368
(58) Field of Classification Search .......... 359/368–390, 359/619
See application file for complete search history.

(56) References Cited

U.S. PATENT DOCUMENTS

| | | | |
|---|---|---|---|
| 6,292,306 B1 | 9/2001 | Betensky | |
| 6,507,434 B2 | 1/2003 | Miyashita | |
| 6,741,394 B1 * | 5/2004 | Tanitsu et al. | 359/619 |
| 2002/0012164 A1 | 1/2002 | Miyashita | |
| 2003/0223108 A1 * | 12/2003 | Miyashita et al. | 359/389 |
| 2004/0125459 A1 | 7/2004 | Tanitsu et al. | |
| 2006/0114554 A1 * | 6/2006 | Suzuki et al. | 359/380 |
| 2009/0073695 A1 * | 3/2009 | Shimamoto | 362/268 |
| 2009/0284833 A1 * | 11/2009 | Shimamoto | 359/385 |

FOREIGN PATENT DOCUMENTS

| | | |
|---|---|---|
| JP | 11-183124 | 7/1999 |
| JP | 2000-88563 | 3/2000 |
| JP | 2003-262508 | 9/2003 |

OTHER PUBLICATIONS

European Search Report dated Dec. 14, 2009.

\* cited by examiner

*Primary Examiner* — Thong Nguyen
(74) *Attorney, Agent, or Firm* — Finnegan, Henderson, Farabow, Garrett & Dunner, L.L.P.

(57) ABSTRACT

A fly eye integrator satisfying the following expression (1) is used for an illumination system: $\Phi \times \phi / f > M \times D_L \times NA_L$  (1) wherein $\Phi$ is a diameter of a circle inscribed to a fly-eye integrator injection end surface; $\phi$ is a diameter of a circle inscribed to an end surface of each of lens elements constituting the fly-eye integrator; f is a focal distance of each of lens elements constituting the fly-eye integrator; M is a zoom multiplication ratio of the image formation optical system; $D_L$ is field-of-view diameter required for the zoom low multiplication unit of the $D_L$ image formation optical system; and $NA_L$ is a numerical aperture required for the zoom low multiplication side of the image formation optical system. Thus, it is possible to provide an image measuring apparatus which can prevent insufficient NA from the low multiplication to the high multiplication of zoom and irregularities of the field-of-view.

4 Claims, 5 Drawing Sheets

Prior Art

DIAMETER OF CIRCLE INSCRIBED IN DEVICE : Φ

DIAMETER OF CIRCLE INSCRIBED IN ELEMENT : φ

FOCAL DISTANCE OF ELMENT : f

IMAGE MEASURING APPARATUS

CROSS-REFERENCE TO RELATED APPLICATIONS

This application is a continuation application of International Application No. PCT/JP2007/071369, filed Nov. 2, 2007, and claims the priority of Japanese Application No. 2006-315382, filed Nov. 22, 2006, the contents of both of which are incorporated herein by reference.

TECHNICAL FIELD

The present invention relates to an optical type image measuring apparatus which measures a specimen such as a machine component and a semiconductor chip.

BACKGROUND ART

Conventionally a measuring microscope or an image measuring apparatus is widely spread as a measuring apparatus which measures a shape size of a workpiece of the specimen. In such measuring apparatuses, the specimen which is placed on a horizontally movable stage is enlarged and projected to an image picking-up apparatus through an optical system, and a surface shape, defect inspection, a coordinate, and dimensions of the specimen are measured by utilizing an image signal into which the projection image is converted. For example, Japanese Patent Publication Laid-Open No. 11-183124 (Patent Document 1) discloses such a measuring apparatus.

Usually the measuring apparatus includes a transmission illumination and an epi-illumination which are of an illumination system, and the epi-illumination is exclusively used when an opaque object such as a machine component is measured. The epi-illumination includes a halogen lamp, a collector lens, and a condenser lens, and the object is illuminated in a telecentric manner through an objective lens.

On the other hand, an image-formation optical system includes an objective lens and an image-formation lens, and an image of the specimen is formed on the image picking-up. There is well known an apparatus including a zoom optical system which can vary magnification according to dimensions of the specimen.

The illumination light in which a balance is established between a wide visual field on a zoom low-power side and a high numerical aperture (NA) on a zoom high-power side is required in the illumination of the apparatus including the zoom optical system. However, in the conventional epi-illumination system, unfortunately NA on the zoom high-power side may be insufficient or a neighborhood of the visual field becomes dark on the zoom low-power side. Recently, with wide spread use of light emitting diode (LED), LED is increasingly adopted as a light source of the illumination optical system. LED has various merits such as lower power consumption, a constant color temperature, and rapid responsibility compared with halogen lamps. However, because the light-emitting area is smaller than that of the halogen lamps, the problems mentioned above become more evident.

In view of the foregoing, an object of the invention is to provide an image measuring apparatus including a zoom optical system, the image measuring apparatus in which lack of NA and uneven visual field in the range of zoom low power to the zoom high power can be prevented using the epi-illumination in which a small-area light source such as LED is used.

DISCLOSURE OF THE INVENTION

In accordance with a first aspect of the invention, an image measuring apparatus includes an image-formation optical system which includes an objective lens and a zoom optical system from a specimen side; and an illumination optical system which includes a light source and a fly-eye integrator from a light source side, the illumination optical system illuminating the specimen through the objective lens, wherein the fly-eye integrator satisfies an expression (1):

$$\Phi + \phi / f > M \times D_L \times NA_L \tag{1}$$

where $\Phi$: diameter of circle inscribed in outgoing end face of fly-eye integrator, $\phi$ is diameter of circle inscribed in end face of each lens element constituting fly-eye integrator, f is focal distance of each lens element constituting fly-eye integrator, M is zoom variable-power ratio of image-formation optical system, $D_L$ is field diameter necessary for zoom low-power side of image-formation optical system, and $NA_L$ is numerical aperture necessary for zoom low-power side of image-formation optical system.

In accordance with a second aspect of the invention, in the image measuring apparatus according to the first aspect, the fly-eye integrator further satisfies expressions (2) and (3):

$$\phi / f > D_L / F \tag{2}$$

$$\phi < NA_L \times F \tag{3}$$

where F is focal distance of objective lens.

In accordance with a third aspect of the invention, the image measuring apparatus according to the first aspect includes an illumination relay lens between the objective lens and the fly-eye integrator.

In accordance with a forth aspect of the invention, in the image measuring apparatus according to the third aspect, the fly-eye integrator further satisfies expressions (2') and (3'):

$$\phi / (f \times B) > D_L / F \tag{2'}$$

$$\phi \times B < NA_L \times F \tag{3'}$$

where F is focal distance of objective lens, and
B is relay lens power.

Accordingly, the invention can provide the image measuring apparatus including the zoom optical system, the image measuring apparatus in which lack of NA and uneven visual field in the range of zoom low power to the zoom high power can be prevented using the epi-illumination in which a small-area light source such as LED is used.

BEST MODE FOR CARRYING OUT THE INVENTION

Figure 1:
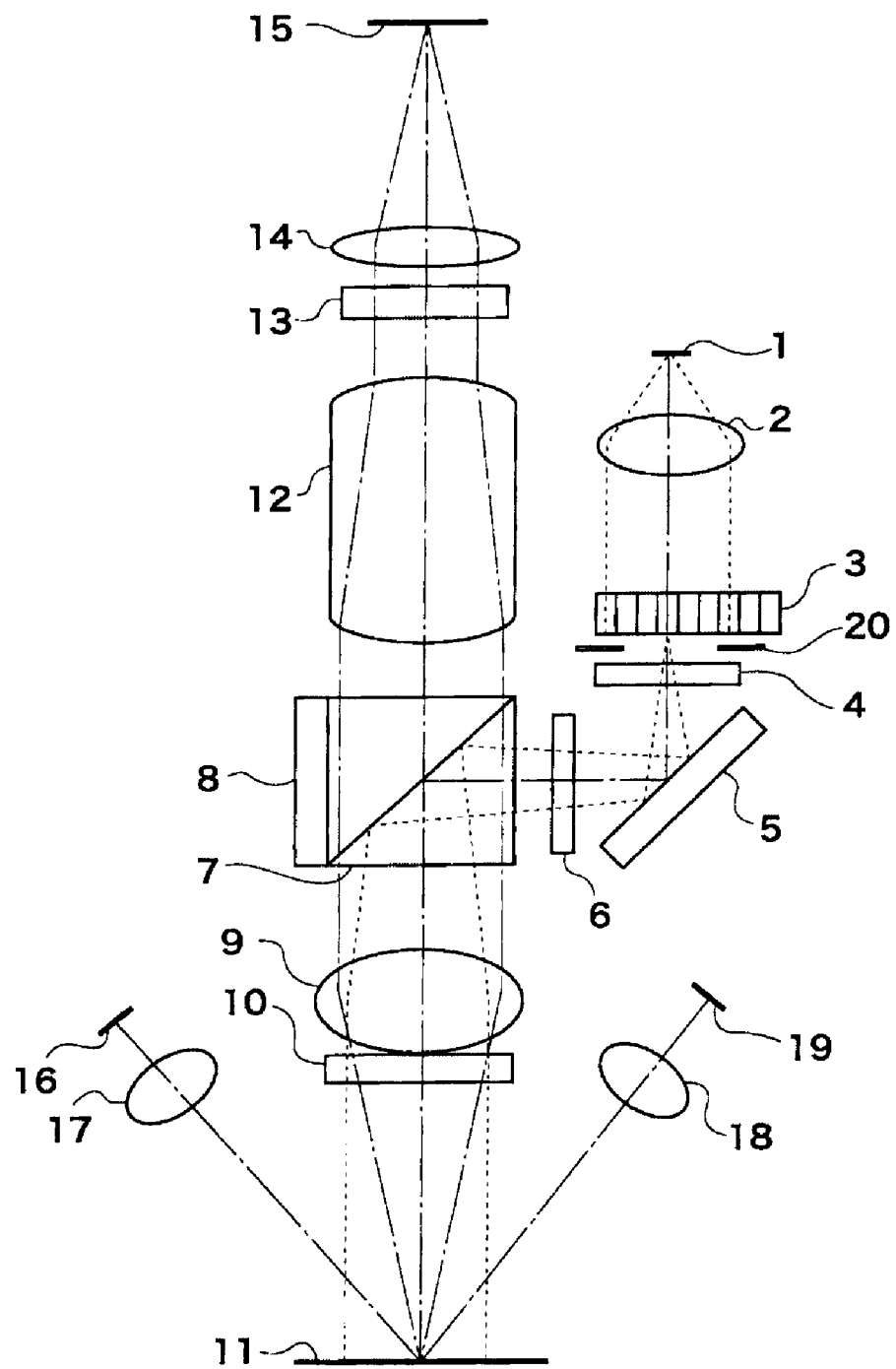
FIG. 1 is a view schematically showing an image measuring apparatus according to a first embodiment of the invention.

Exemplary embodiments of the invention will be described below with reference to the drawings. FIG. 1 is a view schematically showing an image measuring apparatus according to a first embodiment of the invention. Light outgoing from LED 1 is collimated through a collector lens 2, and the light is incident to a fly-eye integrator 3. The fly-eye integrator 3 is disposed at a focal position of an objective lens 9 in order to perform telecentric illumination.

An optical path of a light flux outgoing from the fly-eye integrator 3 is changed by a folding mirror 5 after having passed through a diffuser panel 4, the light flux is reflected by a coating of a polarization beam splitter 7 after having passed through a polarizing plate 6, and the light flux is guided into an image-formation optical system. Meanwhile, excessive light flux is blocked by an aperture stop 20. Then the light flux passes through the objective lens 9 and quarter-wave plate 10, and a specimen 11 is illuminated with the light flux.

The light diffracted from the specimen 11 is transmitted through the coating of the polarization beam splitter 7 after having passed through the quarter-wave plate 10 and the objective lens 9, and the light is incident to a zoom optical system 12. The zoom optical system 12 has a function of changing image-formation magnification of the optical system according to dimensions of the specimen 11. Then the light is transmitted through an analyzer 13, and an image of the specimen is formed on CCD 15 by an image-formation lens 14. The polarizing plate 6, the polarization beam splitter 7, the extinction filter 8, the quarter-wave plate 10, and the analyzer 13 are disposed in order to reduce noises caused by surface reflection from the prism, the objective lens, and the like. Functions of the polarizing plate 6, the polarization beam splitter 7, the extinction filter 8, the quarter-wave plate 10, and the analyzer 13 will be described below.

The polarizing plate 6 is disposed toward an orientation in which linearly polarized light in a direction perpendicular to the paper sheet surface can be transmitted through the polarizing plate 6. The analyzer 13 is disposed toward an orientation in which linearly polarized light in a direction parallel to the paper sheet surface can be transmitted through the analyzer 13. The light transmitted through the polarizing plate 6 becomes the linearly polarized light in the direction perpendicular to the paper sheet surface, and the light is reflected by the polarization beam splitter 7. A component slightly transmitted through the polarization beam splitter 7 is absorbed by the extinction filter 8. The light reflected from the surfaces of the prism and objective lens is linearly polarized light in the direction perpendicular to the paper sheet surface, and therefore most of the light cannot travel in a straight line through the polarization beam splitter 7. Because a partially leak component which travels in the straight line cannot be transmitted through the analyzer 13, the surface reflection light cannot reach CCD 15.

On the other hand, the specimen is illuminated with the illumination light transmitted through the quarter-wave plate 10, and the light diffracted from the specimen is transmitted through the quarter-wave plate again. In the light transmitted through the quarter-wave plate 10 twice, the linearly polarized light in the direction perpendicular to the paper sheet surface is rotated by 90 degrees to become the linearly polarized light in the direction parallel to the paper sheet surface. Therefore, the light reflected from the specimen 11 can be transmitted through the polarization beam splitter 7 and the analyzer 13 to reach CCD 15. The light transmitted through the analyzer 13 becomes the linearly polarized light. Therefore, when a color three-CCD camera is used as CCD 15, in order to avoid an adverse effect of the linearly polarized light, desirably a quarter-wave plate (not shown) is disposed at the back of the analyzer to convert the linearly polarized light into circularly polarized light.

The optical system also includes an auto focus system. The light outgoing from a laser diode 16 is collected onto the specimen by a floodlight lens 17. The light reflected from the specimen is transmitted through a light-receiving lens 18, and an image is formed on a two-divided sensor 19. The image on the sensor is horizontally shifted when the position of the specimen is vertically shifted, which allows auto focus to be performed. An obliquely incident type auto focus is used in the first embodiment. On the other hand, in the case where the objective lens 9 has a relatively large numerical aperture, a knife-edge type auto focus can also be used. In the knife-edge type auto focus, a half of the light transmitted through the objective lens 9 is hidden on a pupil.

On a zoom low-power side of the invention, it is assumed that $D_L$ is a necessary field diameter, $NA_L$ is a necessary numerical aperture, and M is a necessary zoom variable-power ratio. At this point, a field diameter $D_H$ necessary for a zoom high-power side is expressed as follows:

$$D_H \sim D_L/M$$

Because a non-linearly moved optical element exists in the zoom optical system, in order not to generate shading of the light beam, a numerical aperture $NA_H$ necessary for a zoom high-power side is empirically expressed as follows:

$$NA_H \sim NA_L \times M/2 \tag{4}$$

For example, the zoom optical system of the invention is designed as follows:
(1) M=10, $NA_L$=0.027, and $NA_H$=0.11,
(2) M=7, $NA_L$=0.024, and $NA_H$=0.08

The high-power numerical aperture NA computed by the right side of the expression (4) becomes 0.135 in the case (1), and the high-power numerical aperture NA becomes 0.084 in the case (2). Therefore, it is found that the approximation of the expression (4) substantially holds.

Figure 2:
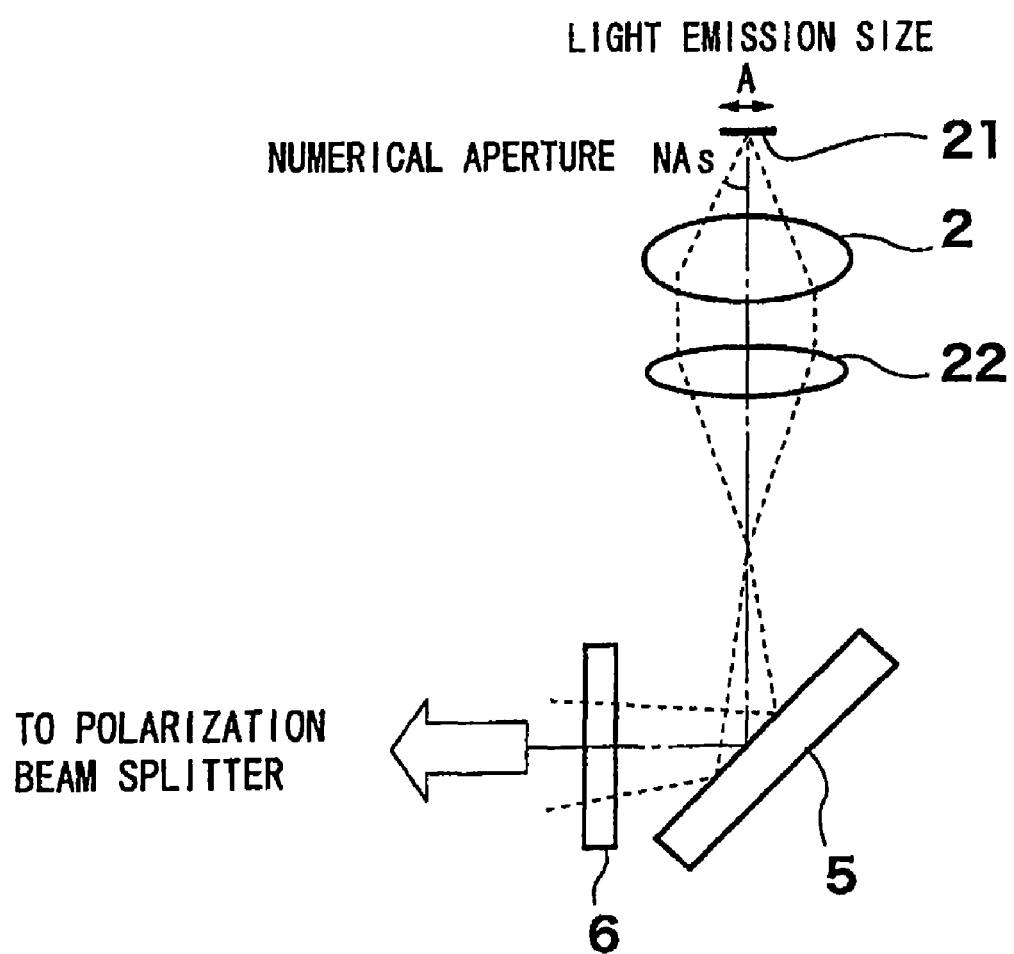
FIG. 2 is a view showing a conventional illumination optical system.

FIG. 2 shows a conventional illumination optical system. Conventionally, the illumination system is formed by combining a condenser lens 22 with the collector lens 2. Assuming that A is a light emission size and $NA_S$ is a numerical aperture of a light source, a condition that should be satisfied by the light source 21 in order to prevent lack of NA and uneven visual field in the range of the zoom lower power to the zoom high power is expressed as follows:

$$A \times NA_s > D_L \times NA_H$$

The expression (4) is substituted into the condition to obtain an expression (5):

$$A \times NA_s > M \times D_L \times NA_L/2 \tag{5}$$

However, in a zoom optical system having a large variable-power ratio, the right side of the expression (5) is excessively increased, and the light source satisfying the expression (5) is hardly found. When LED having various merits such as lower power consumption, a constant color temperature, and rapid responsibility compared with a halogen lamp is adopted as the light source, because LED has generally the light emission size A smaller than that of the halogen lamp, it is further difficult to satisfy the expression (5).

For example, the optical system having the zoom variable-power ratio of 10 times, the lower-power NA of 0.027, and the low-power field diameter of 17 mm, it is assumed that LED is used as the light source while having the size of 1.5 mm²

(square) and the numerical aperture of 0.77. In the numerical aperture of 0.77, a light quantity is decreased to 55%. When these values are substituted into the expression (5), the right side of the expression (5) becomes about 2.3, and the left side becomes about 1.2 even if the light is used until the light quantity is decreased to 55 percent. Therefore, the expression (5) is not satisfied at all, and disadvantageously the neighborhood of the visual field becomes dark on the zoom low-power side or NA becomes insufficient on the high-power side.

Figure 3:
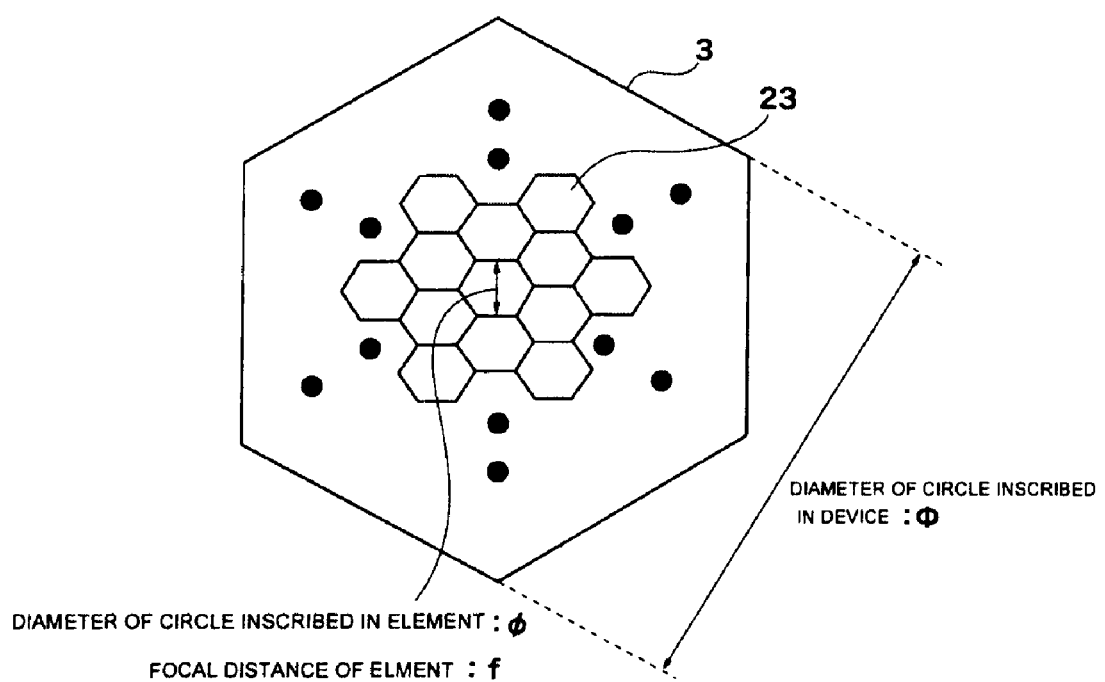
FIG. 3 is a schematic diagram of a fly-eye integrator.

The case in which the fly-eye integrator 3 which is of the distinctive portion of the invention is used is considered. FIG. 3 is a schematic diagram of the fly-eye integrator 3. The fly-eye integrator 3 includes many lens elements 23. FIG. 3 shows the fly-eye integrator whose lens element has a hexagonal shape. However, the lens element may have a square or circular shape. It is assumed that $\Phi$ is a diameter of a circle inscribed in the fly-eye integrator, $\phi$ is a diameter of a circle inscribed in the lens element constituting the fly-eye integrator, and f is a focal distance.

The light flux incident in parallel with the optical axis of the fly-eye integrator is collected by each lens element, and a light source image is formed in an outgoing end face of each element. Therefore, a pseudo light source having the light source size $\Phi$ is obtained, and the numerical aperture of the light outgoing from the pseudo light source becomes $NA_{FI}=\phi/2f$. When the numerical aperture of $NA_{FI}=\phi/2f$ is applied to the expression (5), $A=\Phi$ and $NA_S=NA_{FI}=\phi/2f$ are obtained. The condition that should be satisfied with the fly-eye integrator is expressed by the expression (1):

$$\Phi \times \phi/f > M \times D_L \times NA_L \qquad (1)$$

Therefore, when $\Phi$ and $\phi$ are increased while f is decreased, the left side of the expression (1) can be increased. In this case, the whole surface of the pseudo light source does not emit the light, but only a light source image located near the center of each element emits the light. However, there is no practical issue. That is, the light emitting points are discretely located in the pseudo light source. In the case where $\Phi$ of the fly-eye integrator is excessively large, it is not necessary to illuminate the whole surface of the fly-eye integrator, but the left side of the expression (1) can apparently be decreased by using only a part of the fly-eye integrator. At this point, from the viewpoint of mechanical limitation, the fly-eye integrator can eccentrically be disposed.

In the case where the fly-eye integrator is used, it is necessary to select the fly-eye integrator satisfying at least the expression (1). In the first embodiment, because the outgoing light of the fly eye is directly incident to the objective lens, as described below, the efficient illumination cannot be achieved simply by satisfying the expression (1).

Figure 4:
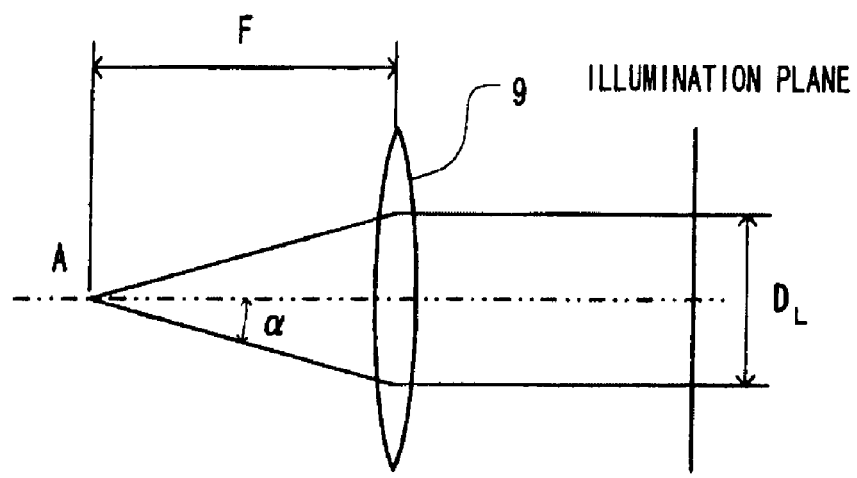
FIG. 4 is view showing a relationship between a numerical aperture and an illumination region of a fly-eye.

Because the numerical aperture of the light outgoing from the fly eye is converted into an illumination field, the neighborhood of the low-power visual field becomes dark unless the illumination field satisfies the field diameter $D_L$ on the zoom low-power side. In FIG. 4, assuming that A is an exit point of each fly eye (lens element), $NA_{FI}=\sin\alpha$, and F is a focal distance of the objective lens 9, the following relationship is required from the relationship of FIG. 4:

$$NA_{FI} \times F > D_L/2$$

When $NA_{FI}=\phi/2f$ is substituted into $NA_{FI} \times F > D_L/2$, the expression (2) is obtained:

$$\phi/f > D_L/F \qquad (2)$$

Figure 5:
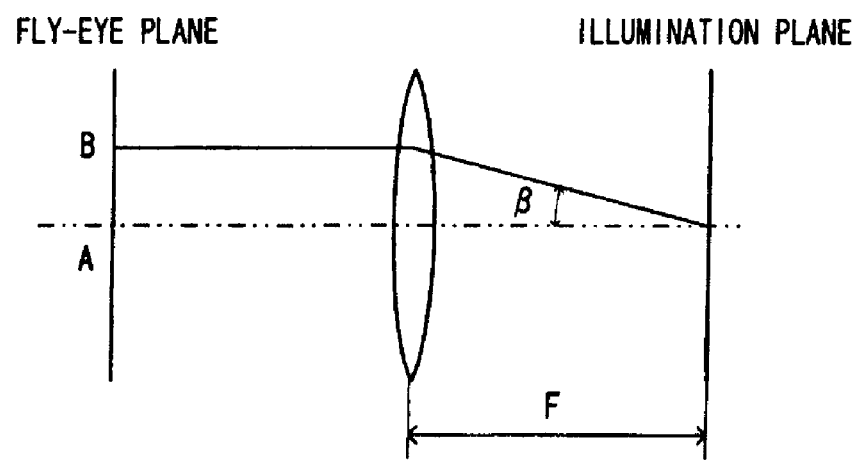
FIG. 5 is a view for explaining a limitation of an interval between fly eyes.

Because the necessary numerical aperture $NA_L$ is small on the zoom low-power side, usage region is decreased in the pseudo light source located at an end face of the fly-eye integrator, and an overlapping effect of the elements is deteriorated. In order to reduce the unevenness, the light outgoing from an exit point A of one fly eye (lens element) and the light outgoing from an exit point B of an adjacent fly eye (lens element) are required to be overlapped in the irradiated surface as shown in FIG. 5. Because of $NA_L=\sin\beta$, it is necessary to satisfy the following expression (3) from the relationship of FIG. 5:

$$\phi < NA_L \times F \qquad (3)$$

Even if the expression (3) is satisfied, because the overlapping effect of the fly-eye integrator is weak on the zoom low-power side, bokeh becomes unnatural. The diffuser panel 4 is required to solve the problem.

For example, it is considered that the optical system having the zoom variable-power ratio of 10 times, the low-power NA of 0.027, the low-power field diameter of 17 mm, and the objective-lens focal distance of 90 mm is combined with the fly-eye integrator. The fly-eye integrator has a device size of 40 mm, each element has a size of 2 mm, and each element has a focal distance of 7 mm. Table 1 shows result in which the values are substituted into the expressions (1), (2), and (3).

TABLE 1

|  | LEFT SIDE | RIGHT SIDE | SATISFIED? |
|---|---|---|---|
| EXPRESSION (1) | 11.4 | 4.6 | OK |
| EXPRESSION (2) | 0.29 | 0.19 | OK |
| EXPRESSION (3) | 2 | 2.4 | OK |

The result satisfies all the conditions, and the optical system in which lack of NA and uneven visual field in the range of zoom low power to the zoom high power are prevented can be formed using the fly-eye integrator.

Figure 6:
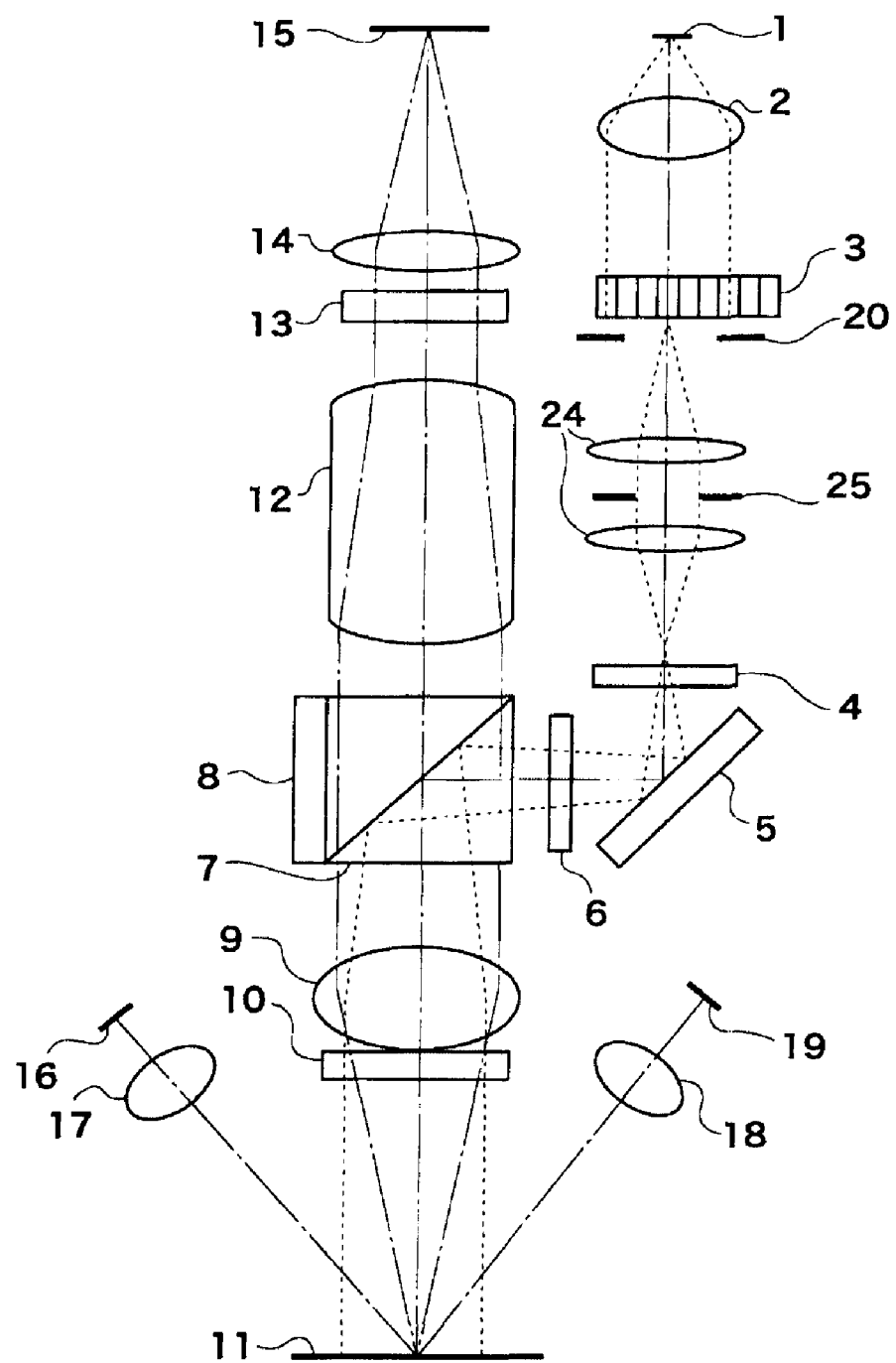
FIG. 6 is a schematic diagram showing an image measuring apparatus according to a second embodiment of the invention.

FIG. 6 is a schematic diagram showing an image measuring apparatus according to a second embodiment of the invention. In FIG. 6, the same component as that of FIG. 1 is designated by the same numeral. The embodiment of FIG. 6 differs from the embodiment of FIG. 1 only in that an illumination relay lens 24 and a field stop 25 are located at the back of the fly-eye integrator 3. Therefore, the description of the same components is omitted and only the different components will be described.

Because the field stop cannot be disposed in the first embodiment of FIG. 1, disadvantageously the illumination field becomes large beyond necessity to cause a stray light or a shape of the illumination field becomes a shape of the end face of each element constituting the fly-eye integrator. In the second embodiment, a point conjugate to the specimen 11 can be formed using the relay lens 24, and the field stop 25 can be disposed at the conjugate point. Thus, the above-mentioned problem can be solved. Because the use of the relay lens changes the magnification, assuming that B is magnification of the relay lens, the following relationships are obtained:

$$NA_{FI} \to NA_{FI}/B, \text{ that is, } \phi/(2 \times f) \to \phi/(2 \times f \times B)$$

$$\phi \to \phi \times B$$

Assuming that B is magnification of the relay lens, the conditions of the expressions (2) and (3) are changed as follows:

$$\phi/(f \times B) > D_L/F \qquad (2')$$

$$\phi \times B < NA_L \times F \qquad (3')$$

The expressions (2') and (3') indicate that the fly-eye integrator can be used in the second embodiment using the relay lens having reduction magnification even if the fly-eye integrator cannot be used in the optical system of the first embodiment because the fly-eye integrator does not satisfy the expressions (2) and (3). That is, the second embodiment also has an effect of widening the application of the fly-eye integrator.

For example, it is considered that the optical system having the zoom variable-power ratio of 10 times, the low-power NA of 0.027, the low-power field diameter of 17 mm, and the objective-lens focal distance of 90 mm is combined with the fly-eye integrator. The fly-eye integrator has a device size of 45 mm, each element has a size of 3 mm, and each element has a focal distance of 20 mm. Table 2 shows result in which the values are substituted into the expressions (1), (2), and (3).

TABLE 2

|   | LEFT SIDE | RIGHT SIDE | SATISFIED? |
| --- | --- | --- | --- |
| EXPRESSION (1) | 6.8 | 4.6 | OK |
| EXPRESSION (2) | 0.15 | 0.19 | NG |
| EXPRESSION (3) | 3 | 2.4 | NG |

As a result, the expressions (2) and (3) are not satisfied. When the fly-eye integrator is used in the image measuring apparatus of the first embodiment, problems such as lack of NA and deterioration of the light quantity in the periphery of the visual field are generated. Under the circumstances, when the second embodiment is adopted, in which the illumination relay lens having the magnification of 0.7 time is used with the fly-eye integrator, the result of Table 3 is obtained by the substitution into the expressions (1), (2'), and (3').

TABLE 3

|   | LEFT SIDE | RIGHT SIDE | SATISFIED? |
| --- | --- | --- | --- |
| EXPRESSION (1) | 6.8 | 4.6 | OK |
| EXPRESSION (2') | 0.21 | 0.19 | OK |
| EXPRESSION (3') | 2.1 | 2.4 | OK |

Accordingly, all the conditions are satisfied, and the optical system in which lack of NA and uneven visual field are prevented in the range of the zoom low power to the zoom high power can be formed using the fly-eye integrator and the illumination relay lens. That is, even for the fly-eye integrator which cannot be used in the image measuring apparatus of the first embodiment, the fly-eye integrator can be used by the configuration of the image measuring apparatus of the second embodiment, and the application of the fly-eye integrator can be widened.

The invention claimed is:

1. An image measuring apparatus for measuring a specimen comprising:
   an image-formation optical system which includes a zoom optical system and an objective lens which is placed between the specimen and the zoom optical system, the image-formation optical system being configured to form an image of the specimen; and
   an illumination optical system which includes a light source and a fly-eye integrator which is placed between the light source and the objective lens, the illumination optical system being configured to illuminate a region, which is imaged by the image-formation optical system, on the specimen,
   wherein the fly-eye integrator satisfies an expression (1):

$$A \times \Phi / f > M \times D_L \times NA_L \quad (1)$$

where A is the diameter of a circle inscribed in pseudo light sources of which light can pass the objective lens, and the pseudo light sources being formed on outgoing end face of fly-eye integrator,
   $\Phi$ is the diameter of a circle inscribed in end face of each lens element constituting fly-eye integrator,
   f is a focal distance of each lens element constituting fly-eye integrator,
   M is a zoom variable-power ratio of the image-formation optical system,
   $D_L$ is an effective field diameter of the image-formation optical system with minimum magnification, and
   $NA_L$ is a numerical aperture on the object side in the image-formation optical system with minimum magnification.

2. The image measuring apparatus according to claim 1, wherein the fly-eye integrator further satisfies expressions (2) and (3):

$$\Phi / f > D_L / F \quad (2)$$

$$\Phi < NA_L \times F \quad (3)$$

where F is focal distance of objective lens.

3. The image measuring apparatus according to claim 1, comprising an illumination relay lens between the objective lens and the fly-eye integrator.

4. The image measuring apparatus according to claim 3, wherein the fly-eye integrator further satisfies expressions (2') and (3'):

$$\Phi (f \times B) > D_L / F \quad (2')$$

$$\Phi \times B < NA_L \times F \quad (3')$$

where F is a focal distance of the objective lens, and B is a magnification of the relay lens.

* * * * *